United States Patent [19]
Karlström et al.

[11] 4,244,411
[45] Jan. 13, 1981

[54] INSULATING COVER

[75] Inventors: Anders Karlström, Stockholm; Anders Eriksson, Saltsjö-Boo, both of Sweden

[73] Assignee: AB Smulan, Nacka, Sweden

[21] Appl. No.: 74,639

[22] Filed: Sep. 12, 1979

[30] Foreign Application Priority Data

Sep. 13, 1978 [SE] Sweden .................................. 7809644

[51] Int. Cl.³ .............................................. B65D 65/26
[52] U.S. Cl. ................................................... 150/52 F
[58] Field of Search ........................... 150/52 F, 52 R; 220/1.5; 206/600

[56] References Cited

U.S. PATENT DOCUMENTS

| | | | |
|---|---|---|---|
| 1,315,794 | 9/1919 | Richards | 150/52 R |
| 2,078,400 | 4/1937 | Maupin | 150/52 F |
| 2,808,093 | 10/1957 | Gilman | 150/52 F |
| 3,088,619 | 5/1963 | Boucher | 150/52 R X |

*Primary Examiner*—Donald F. Norton

*Attorney, Agent, or Firm*—Sughrue, Rothwell, Mion, Zinn and Macpeak

[57] ABSTRACT

The invention relates to an insulating cover comprising four side-walls and a roof-structure, the side-walls and the roof-structure comprising an outer and an inner layer of a flexible material and an intermediate insulating layer of an elastic foamed plastics material or like material. At least a part of the side-walls are openable by means of slide chain fastener means extending around the part, and the cover is intended to be placed over and around goods carried by a substantially rectangular load-carrying device, such as a pallet, having arranged around at least two mutually opposite side-edges a substantially planar frame-structure, which projects upwardly from the load-carrying surface of said load-carrying device, wherein two mutually opposite side-walls and the roof-structure extending therebetween form a coherent unit which is detachably connected to the other two side-walls by means of sliding chain fasteners.

5 Claims, 4 Drawing Figures

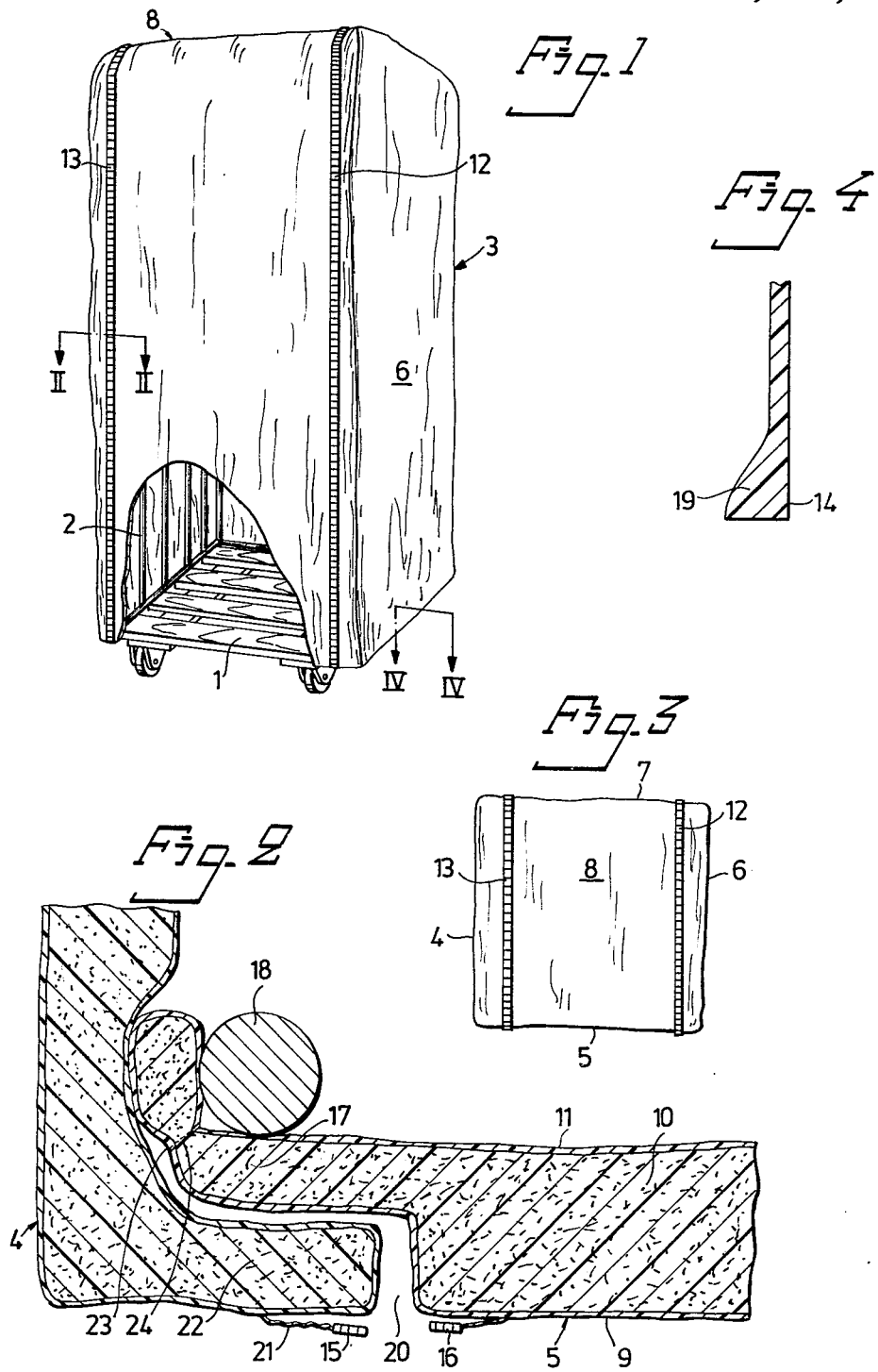

INSULATING COVER

BACKGROUND OF THE INVENTION

The present invention relates to an insulating cover comprising four side walls and a roof structure, the roof structure comprising an outer and an inner layer, e.g. a vinyl-resin material, and an intermediate layer of a pliant, resilient foamed plastics material or like material, the cover being intended to be placed around goods on a rectangular loading pallet which has a substantially planar frame structure extending around at least two mutually opposing side edges and projecting upwardly from the load-carrying surface of the pallet.

Insulating covers for the transport of, e.g. refrigerated goods have hitherto had the form of rigid units of the refrigerator-box type. Although such boxes are excellent from the aspect of insulation, they have the disadvantage of being too bulky and take up too much space when being returned empty. It is also known to use small insulating covers which are filled with, e.g. wadding, foamed plastics or like materials and which are used to insulate small cooking vessels from the ambient air. One important advantage afforded by such a soft, insulating cover is that it can be compressed. Consequently, it would seem in theory that such a cover could be made in a larger size, such as to render it useful for insulating goods loaded on pallets. One disadvantage with such a cover made of a soft material and of known construction is that it must be lifted off the pallet before the goods can be removed therefrom. It is also difficult to pack.

It is, therefore, a primary object of the invention to provide an insulating cover of the kind mentioned in the introduction which can be stored in a collapsed state, thereby to take up the least room possible, which can be readily opened and which affords good insulation.

BRIEF DESCRIPTION OF THE DRAWINGS

The characterizing features essential to the invention are disclosed in the claims, and an embodiment is described hereinafter with reference to the accompanying drawing, in which FIG. 1 illustrates an insulating cover constructed in accordance with the invention, said cover being partly cut away, to show one side-structure of a loading pallet, FIG. 2 is a sectional view taken on the line II—II in FIG. 1, FIG. 3 is a top plan view of the cover shown in FIG. 1, and FIG. 4 is a side view along the line IV—IV in FIG. 1.

DETAILED DESCRIPTION OF THE PREFERRED EMBODIMENT

In FIG. 1 there is shown a rectangular loading pallet 1 which carries on each of two mutually opposite sides thereof a respective, substantially rectangular frame structure, of which only one frame structure, 2, is shown. The frame structures, which extend upwardly from the load-carrying surface of the pallet, are suitably attached to the pallet in a releasable fashion. Mounted on pallet 1 is an insulating cover 3, which comprises four substantially rectangular side walls 4,5,6 and 7, and a rectangular roof structure 8. When seen in a plane extending parallel with the pallet 1, the cross-sectional shape of the cover corresponds substantially with the form of the pallet. As will best be seen from FIG. 2, each of the side walls 4,5,6 and 7, and the roof 8 comprises an outer layer 9 constructed of, e.g. a reinforced vinyl plastics material or a like material, an intermediate layer 10 of a heat-insulation material, such as a resilient foam-plastics material or like material, and an inner layer 11 of a vinyl plastics material or like material. The two layers 9 and 11 are formed together either by welds or by seams. In order to ensure that the space required to transport the empty covers, when the pallets have been unloaded, is the smallest possible, the cover is provided with two chain fasteners 12 and 13. Each chain fastener 12,13 extends from the lower edge 14 of the cover 3, up along the forward side-wall 5, over the roof 8, and down along the rear side-wall 7. The chain fasteners are placed as close as possible to the side-walls 4 and 6 adjacent respective side-walls 5 and 7, in a manner such that the largest possible opening is obtained when the fasteners 12 and 13 are opened on the forward side of the cover 3, thereby to enable the side-wall 5 to be folded up onto the roof 8 when, for example, only part of the goods is to be removed.

When the insulating cover is to be returned, the two chain or 'zip'-fasteners 12 and 13 are opened, said fasteners extending in a plane which is parallel with respective side-walls 6 and 4, whereby the cover 3 is formed into three parts, of which parts a first comprises the sidewall 4 with a chain fastener part 15 (see FIG. 2) hanging therefrom, a second comprises the side-wall 6 with its associated chain fastener part 2, and a third comprises the side-wall 5, the roof-structure 8 and the side-wall 7 with their respective associated chain fastener parts, e.g. the chain fastener part 16 shown in FIG. 2. The coherent unit 5,8,7, can readily be folded to the same size as the size of the side-walls 4 and 6, thereby to form a thin and flat package.

In order to prevent air leaking into the cover 3, and hence to avoid any impairment of the insulating properties of the cover, the chain fasteners are sealed by means of a flap 17 which extends along the long edges of the side-walls 5 and 7 and preferably also along the edges of the roof structure 8. The thickness of the flap 17 is suitably half that of the walls, whilst the length of the flap is suitably such as to enable it to be inserted between adjacent side-walls 4 and 6 respectively and adjacent parts of the frame structure, as indicated in FIG. 2 by the tube 18, said tube being shown in FIG. 1 by a broken line. Since the material from which the sidewalls and the flap are made is flexible, the material can be compressed sufficiently to allow the flap to lie sealingly and resiliently against the frame structure and the associated side-walls.

Thus, the insulating cover will form in practice a completely leak-free unit, despite being comprised of three mutually detachable parts. In order to effectively eliminate the risk of leakage at the edges of the pallet, the lower edges of all the side-walls may, according to the invention, be provided with a thickened, elastic portion 19. This sealing flange 19 presses against the side edges of the pallet 1 in sealing abutment therewith.

In order to avoid the formation of a gap 20 (FIG. 2) beneath the chain fasteners, at least one of the said chain fastener parts, e.g. the part 15 shown in FIG. 2, is conveniently attached to the outer layer by means of an elastic band 21 which stretches when the chain fastener parts 15 and 16 are joined together, thereby to impart a tensioning force to the wall part 22. As will readily be understood, both of said chain fastener parts may be attached by means of such an elastic band 21, which will, of course, extend along the whole length of its associated fastener.

In order to enable the flap 17 to be readily folded in behind the frame structure, the flap is conveniently provided along the whole of its length with a fold 23, formed by means of a straight seam 24. Conveniently, the seam 24 is made in a manner such that the two layers lie directly against each other, whereby a hinge is formed.

To prevent air leaking through the pallet, the pallet 1 is suitably provided with a bottom plate made of polyurethane for example.

The invention can be applied to other kinds of load-carrying devices, and thus the pallet 1 can be replaced by a carriage or the like.

We claim:

1. An insulating cover (3) comprising four side-walls (4,5,6,7) and a roof-structure (8), said side-walls and said roof-structure comprising an outer and an inner layer (9,11) of a flexible material and an intermediate insulating layer (10) of an elastic foamed plastics material, at least one of the side-walls being openable by means of slide chain fastener means, and said cover being intended to be placed over and around goods carried by a substantially rectangular load-carrying device, such as a pallet, having arranged on at least two mutually opposite side-edges a substantially planar frame-structure (2), which projects upwardly from the load-carrying surface of said load-carrying device, wherein two mutually opposite side-walls (5,7) and the roof-structure (8) extending therebetween form a coherent unit which is detachably connected to the other two side-walls (4,6) by means of said slide chain fastener means (12,13).

2. A cover according to claim 1, characterized in that said unit has extending along said slide chain fastener means a flap (17) which extends beyond said fastener means and which is arranged to lie between the adjacent side-wall (4) and the frame structure (2,18).

3. A cover according to claim 1 or claim 2, characterized in that said slide chain fastener means comprises a first chain fastener part (16) joined to said unit (5,7,8,) and a second chain fastener part (15) joined to the adjacent wall (4) of said other side-walls, of which chain fastener parts at least one is attached to an elastic securing tape (21).

4. A cover according to claims 1 or 2, characterized in that on the lower edge of each of said side-walls there is provided an inwardly projecting elastic sealing flange (19) which is arranged to lie against the edges of the loading pallet (1).

5. A cover according to claim 2, characterized in that the flap (17) is provided with a longitudinally extending fold (23) which forms a hinge.

* * * * *